(12) United States Patent
Jeong et al.

(10) Patent No.: US 12,418,020 B2
(45) Date of Patent: Sep. 16, 2025

(54) POROUS CARBON MATERIAL HAVING CORE-SHELL STRUCTURE, PREPARATION METHOD THEREOF, SULFUR-CARBON COMPOSITE COMPRISING SAME, AND LITHIUM SECONDARY BATTERY

(71) Applicant: LG ENERGY SOLUTION, LTD., Seoul (KR)

(72) Inventors: Yochan Jeong, Daejeon (KR); Kwonnam Sohn, Daejeon (KR); Changhoon Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 601 days.

(21) Appl. No.: 17/793,630

(22) PCT Filed: Oct. 21, 2021

(86) PCT No.: PCT/KR2021/014801
§ 371 (c)(1),
(2) Date: Jul. 18, 2022

(87) PCT Pub. No.: WO2022/086211
PCT Pub. Date: Apr. 28, 2022

(65) Prior Publication Data
US 2023/0058900 A1 Feb. 23, 2023

(30) Foreign Application Priority Data
Oct. 23, 2020 (KR) ........................ 10-2020-0138507

(51) Int. Cl.
*H01M 4/36* (2006.01)
*C01B 32/318* (2017.01)
(Continued)

(52) U.S. Cl.
CPC ........... *H01M 4/364* (2013.01); *C01B 32/318* (2017.08); *C01B 32/348* (2017.08); *H01M 4/366* (2013.01);
(Continued)

(58) Field of Classification Search
CPC ........ H01M 4/364; H01M 4/366; H01M 4/38; H01M 4/587; H01M 2004/021;
(Continued)

(56) References Cited

U.S. PATENT DOCUMENTS 10,468,712 B2 11/2019 Otter et al.
2002/0187896 A1 12/2002 Ryoo et al.
(Continued)

FOREIGN PATENT DOCUMENTS

CN 105384161 A * 3/2016
CN 108352514 A 7/2018
(Continued)

OTHER PUBLICATIONS

Machine Translation of WO_2017049466_A1 (Mar. 6, 2025) (Year: 2025).*

(Continued)

*Primary Examiner* — Matthew J Merkling
(74) *Attorney, Agent, or Firm* — Bryan Cave Leighton Paisner LLP (57) ABSTRACT

The present disclosure provides a porous carbon material having a core-shell structure, which comprises a core comprising a structure formed by stacking carbon sheets, and a shell comprising carbon surrounding the core, and a preparation method thereof, a sulfur-carbon composite comprising the same, and a lithium secondary battery comprising the same.

13 Claims, 7 Drawing Sheets

(51) Int. Cl.
*C01B 32/348* (2017.01)
*H01M 4/02* (2006.01)
*H01M 4/38* (2006.01)
*H01M 4/587* (2010.01)

(52) U.S. Cl.
CPC ............ *H01M 4/38* (2013.01); *H01M 4/587* (2013.01); *C01P 2002/85* (2013.01); *C01P 2004/03* (2013.01); *C01P 2004/82* (2013.01); *C01P 2006/12* (2013.01); *C01P 2006/40* (2013.01); *H01M 2004/021* (2013.01); *H01M 2004/028* (2013.01)

(58) Field of Classification Search
CPC .......... H01M 2004/028; C01P 2006/12; C01P 2006/40; C01P 2004/03; C01P 2004/82; C01P 2002/85
See application file for complete search history.

(56) References Cited

U.S. PATENT DOCUMENTS

| | | | |
|---|---|---|---|
| 2010/0143721 A1* | 6/2010 | Chen | C01G 51/82 428/407 |
| 2011/0059361 A1* | 3/2011 | Wilkening | H01M 4/602 429/236 |
| 2013/0209891 A1* | 8/2013 | Neumann | H01M 4/0416 427/113 |
| 2014/0045072 A1 | 2/2014 | Neumann et al. | |
| 2015/0017524 A1 | 1/2015 | Lee et al. | |
| 2015/0099180 A1 | 4/2015 | Cericola et al. | |
| 2017/0008769 A1* | 1/2017 | Otter | H01M 10/0525 |
| 2017/0170465 A1 | 6/2017 | Kim et al. | |
| 2018/0351166 A1* | 12/2018 | Chen | C01B 32/174 |
| 2019/0123377 A1 | 4/2019 | Yang et al. | |
| 2020/0099054 A1* | 3/2020 | Liu | H01M 4/136 |

FOREIGN PATENT DOCUMENTS

| | | |
|---|---|---|
| CN | 110467182 A | 11/2019 |
| EP | 3 131 848 B1 | 3/2018 |
| JP | 2003-034516 A | 2/2003 |
| JP | 2009-143786 A | 7/2009 |
| JP | 2012-12263 A | 1/2012 |
| JP | 2014-511816 A | 5/2014 |
| JP | 2015-525184 A | 9/2015 |
| JP | 2018-535915 A | 12/2018 |
| JP | 2019-513673 A | 5/2019 |
| KR | 10-0420787 B1 | 2/2004 |
| KR | 10-1379716 B1 | 3/2014 |
| KR | 10-2014-0075261 A | 6/2014 |
| KR | 10-2015-0009116 A | 1/2015 |
| KR | 10-2016-0037084 A | 4/2016 |
| KR | 10-2018-0080316 A | 7/2018 |
| KR | 10-2020-0058920 A | 5/2020 |
| WO | WO-2012119666 A1 * | 9/2012 ............ C01B 31/00 |
| WO | WO-2017049466 A1 * | 3/2017 ............ H01M 4/00 |

OTHER PUBLICATIONS

Liao, et al. (2017) "Novel Flower-Like Hierarchical Carbon Sphere with Multi-Scale Pores Coated on PP Separator For High-Performance Lithium-Sulfur Batteries," Electrochimica Acta. vol. 257 (Accepted Manuscript), 24 pages.
Liu, et al. (2012) "A Yolk-Shell Design for Stabilized and Scalable Li-Ion Battery Alloy Anodes," Nano Letters. vol. 12, 6, pp. 3315-3321.
Wang, et al. (2014) "Three-Dimensional Flower-Like And Hierarchical Porous Carbon Materials As High-Rate Performance Electrodes for Supercapacitors," Carbon. vol 67. pp. 119-127.
Song et al. (2009). "Hierarchical Porous Core-Shell Carbon Nanoparticles", Chem. Mater, vol. 21, pp. 1524-1530.
Lv et al. (2011). "One-pot Self-Assembly of Three-Dimensional Graphene Macroassemblies with Porous Core and Layered Shell", Journal of Materials Chemistry, vol. 21, pp. 12352-12357.
Liang et al. (2019). "Nanodiamond Core/Onion-Like Carbon Shell Materials with Excellent Visible Light Photocatalytic Activity", Materials Research Express 6, 045609 (8 pages).
Chen, et al. (2020). "Synthesis of Sandwich-Like Graphene@mesoporous Nitrogen-Doped Carbon Nanosheets for Application in High-Performance Supercapacitors," Nanotechnology, vol. 31, 024001 (8 pages).

* cited by examiner

【Figure 8】

POROUS CARBON MATERIAL HAVING CORE-SHELL STRUCTURE, PREPARATION METHOD THEREOF, SULFUR-CARBON COMPOSITE COMPRISING SAME, AND LITHIUM SECONDARY BATTERY

CROSS CITATION WITH RELATED APPLICATIONS

The present application is a National Phase entry pursuant to 35 U.S.C. § 371 of International Application No. PCT/KR2021/014801, filed on Oct. 21, 2021, and claims priority to and the benefit of Korean Patent Application No. 10-2020-0138507, filed on Oct. 23, 2020, the entire contents of which are incorporated herein by reference in their entirety.

TECHNICAL FIELD

The present invention relates to a porous carbon material of a core-shell structure, a preparation method thereof, a sulfur-carbon composite comprising the same, and a lithium secondary battery.

BACKGROUND

The application area of secondary battery is expanding to the electric vehicles (EV) or the energy storage devices (ESS), and thus the lithium-sulfur secondary battery which can achieve the theoretically high weight-to-energy storage density (~2,600 Wh/kg) is attracting attention as a next-generation secondary battery technology.

The lithium-sulfur secondary battery is a battery system using a sulfur-based material having a sulfur-sulfur bond as a positive electrode active material and using lithium metal as a negative electrode active material. Such lithium-sulfur secondary battery has an advantage in that sulfur, which is the main material of the positive electrode active material, is very rich in resources all over the world, is not toxic, and has a low atomic weight.

In the lithium-sulfur secondary battery, when discharging the battery, lithium which is a negative electrode active material is oxidized while releasing electron and thus ionizing, and the sulfur-based material which is a positive electrode active material is reduced while accepting the electron. In that case, the oxidation reaction of lithium is a process by which lithium metal releases electron and is converted to lithium cation form. In addition, the reduction reaction of sulfur is a process by which the sulfur-sulfur bond accepts two electrons and is converted to a sulfur anion form. The lithium cation produced by the oxidation reaction of lithium is transferred to the positive electrode through the electrolyte and is combined with the sulfur anion generated by the reduction reaction of sulfur to form a salt. Specifically, sulfur before discharging has a cyclic S8 structure, which is converted to lithium polysulfides ($LiS_x$, x=8, 6, 4, 2) by the reduction reaction. When the lithium polysulfide is completely reduced, lithium sulfide ($Li_2S$) is finally produced.

Sulfur, which is a positive electrode active material, is difficult to secure reactivity with electrons and lithium ions in a solid state due to its low electrical conductivity characteristics. In the existing lithium-sulfur secondary battery, in order to improve the reactivity of sulfur, an intermediate polysulfide in the form of $Li_2S_x$ is generated to induce a liquid phase reaction and improve the reactivity. In this case, an ether-based solvent such as dioxolane and dimethoxy ethane, which are highly soluble for lithium polysulfide, is used as a solvent for the electrolyte solution. Also, in the conventional lithium-sulfur secondary battery, a catholyte-type lithium-sulfur secondary battery system is built to improve the reactivity, and in this case, due to the characteristics of lithium polysulfide dissolved in the electrolyte solution, the reactivity and lifetime characteristics of sulfur are affected depending on the content of the electrolyte solution. In order to achieve high energy density, the electrolyte solution should be injected with a low content, but as the content of the electrolyte solution is decreased, the concentration of lithium polysulfide in the electrolyte solution is increased, making it difficult for the battery to operate normally due to a decrease in the fluidity of the active material and an increase in side reactions.

Since the leaching of lithium polysulfide adversely affects the capacity and lifetime characteristics of the battery, various techniques have been proposed to suppress the leaching of lithium polysulfide.

As an example, Korean Laid-open Patent Publication No. 2016-0037084 discloses that it is possible to block the melting and leaching of lithium polysulfide and improve the conductivity of the sulfur-carbon nanotube composite by using an agglomerate of carbon nanotubes with a three-dimensional structure coated with graphene as a carbon material.

In addition, Korean Patent No. 1379716 discloses that the leaching of the lithium polysulfide can be suppressed by using the graphene composite, which comprises sulfur prepared through a method of treating graphene with hydrofluoric acid to form pores on the surface of graphene and allowing sulfur particles to grow in the pores, as the positive electrode active material, thereby minimizing the decrease in the capacity of the battery.

The above patents have improved the problem of the reduction in the performance of the lithium-sulfur secondary battery to some extent by changing the structure or material of the sulfur-carbon composite used as a positive electrode active material and thus preventing the leaching of the lithium polysulfide, but the effect is not sufficient. Therefore, in order to manufacture a lithium-sulfur secondary battery with high energy density, there is a need for a battery system capable of operating an electrode having high loading and low porosity, and in the relevant technical field, research on such a battery system is continuously being conducted.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

PRIOR ART DOCUMENT

Patent Document

Korean Laid-open Patent Publication No. 2016-0037084

DISCLOSURE

Technical Problem

It is an object of the present invention to provide a porous carbon material having a core-shell structure comprising a core part that is formed by stacking carbon sheets and thus facilitates the exit and entry of lithium ions and a shell part that suppresses the leaching of lithium polysulfide.

In addition, it is an object of the present invention to provide a method for preparing the porous carbon material having the core-shell structure, a sulfur-carbon composite comprising the porous carbon material having the core-shell structure, and a lithium secondary battery comprising the same.

Technical Solution

In order to achieve the above objects, the present invention provides a porous carbon material having a core-shell structure, which comprises a core having a structure formed by stacking carbon sheets, and a shell comprising carbon surrounding the core.

In addition, the present invention provides a method for preparing a porous carbon material having a core-shell structure, which comprises the steps of,
a) mixing a carbon precursor having a melting point of 130 to 350° C. and at least one particle selected from the group consisting of basic zinc carbonazate (BZC), zinc (II) metal-organic frameworks, and porous ZnO as a template;
b) penetrating the carbon precursor into the template by heating the mixture to 120 to 350° C.;
c) forming a core-shell shape while removing the template by heating the structure formed by penetration of the carbon precursor into the template to 600 to 900° C.; and
d) heating the structure having the core-shell shape to 800 to 1500° C. to vaporize and remove zinc impurities.

In addition, the present invention provides a sulfur-carbon composite comprising a porous carbon material with a core-shell structure and a sulfur component.

In addition, the present invention provides a lithium secondary battery comprising the sulfur-carbon composite.

Advantageous Effects

The porous carbon material having a core-shell structure of the present invention is composed of a core part that is formed by stacking carbon sheets and thus facilitates the exit and entry of lithium ions and a shell part that suppresses the leaching of lithium polysulfide, and thus provides the effect of remarkably improving the capacity, charging/discharging, and lifetime characteristics of the lithium ion battery by facilitating the exit and entry of lithium ions, and effectively suppressing the leaching of lithium polysulfide.

In addition, the sulfur-carbon composite of the present invention provides the effect of remarkably improving the capacity, charge/discharge and lifetime characteristics of the lithium-ion battery by comprising the carbon material, and the lithium-sulfur battery comprising the sulfur-carbon composite also provides the effect of significantly improving the capacity, charging/discharging and lifetime characteristics.

In addition, the method for preparing a porous carbon material having a core-shell structure according to the present invention provides a method for efficiently preparing the porous carbon material having the core-shell structure as described above.

DETAILED DESCRIPTION

Hereinafter, the present invention will be described in detail.

The present invention relates to a porous carbon material having a core-shell structure, which comprises a core comprising a structure formed by stacking carbon sheets, and a shell comprising carbon surrounding the core.

The porous carbon material having the core-shell structure of the present invention is composed of a core part that is formed by stacking carbon sheets and thus facilitates the exit and entry of lithium ions and a shell part that suppresses the leaching of lithium polysulfide, thereby having the characteristics of facilitating the exit and entry of lithium ions and effectively inhibiting the leaching of lithium polysulfide.

In one embodiment of the present invention, the carbon sheet may be a graphene sheet.

In one embodiment of the present invention, the structure formed by stacking the carbon sheets may be a hierarchical porous structure.

In one embodiment of the present invention, the porous carbon material may have a specific surface area of 300 $m^2/g$ to 2000 $m^2/g$.

The porous carbon material having the core-shell structure includes irregular pores therein, and the average diameter of the pores may be in the range of 1 to 1000 nm, and the porosity may be in the range of 10 to 90% of the total volume of the porous carbon material.

In one embodiment of the present invention, the core-shell structure may be formed by performing heat-treatment in a state in which a carbon precursor having a melting point of 130 to 350° C. is penetrated into the inside of one or more template particles selected from basic zinc carbonazate (BZC), zinc (II) metal-organic frameworks, porous structure ZnO and the like.

In the above, if the melting point of the carbon precursor is less than 130° C., it is not preferable because the carbon precursor cannot be injected into the shape of the template in a solid state. If the melting point of the carbon precursor exceeds 350° C., it is not preferable because the decomposition reaction is proceeded before it is injected into the shape of the template.

The carbon precursor may be at least one selected from glucose, sucrose, lactose, fructose, starch, tannic acid, and the like.

The heat-treated carbon precursor forms a core comprising a structure formed by stacking carbon sheets, and the heat-treated template forms a shell.

In the above, the heat-treatment may be carbonization or graphitization treatment, and specifically, for example, the heat-treatment of the carbon precursor and the template is primarily performed at 600 to 900° C., and secondarily at 800 to 1500° C.

In addition, the present invention relates to a method for preparing a porous carbon material having a core-shell structure, which comprising the steps of,
 a) mixing a carbon precursor having a melting point of 130 to 350° C. and at least one particle selected from basic zinc carbonazate (BZC), zinc (II) metal-organic frameworks, and porous structure ZnO as a template;
 b) penetrating the carbon precursor into the template by heating the mixture to 120 to 350° C.;
 c) forming a core-shell shape while removing the template by heating the structure formed by penetration of the carbon precursor into the template to 600 to 900° C.; and
 d) heating the structure having the core-shell shape to 800 to 1500° C. to vaporize and remove zinc impurities.

Figure 8:
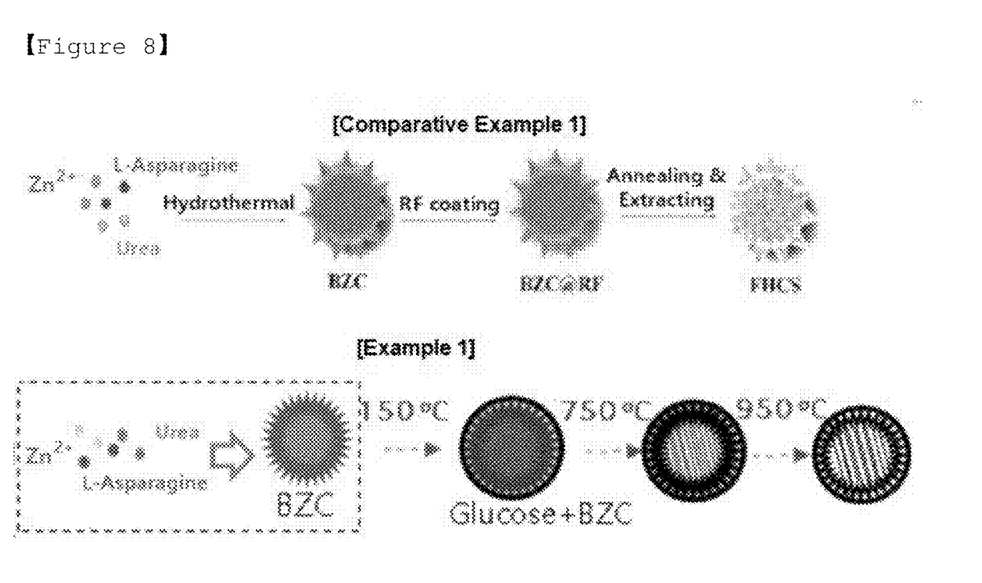
FIG. 8 is a view schematically showing a method of preparing the porous carbon material having the core-shell structure according to the present invention.

All of the contents described in the above-described porous carbon material having a core-shell structure may be applied to the preparing method, and the preparing method may be schematically described with reference to FIG. 8.

The heating in step b) may be preferably carried out at 130 to 180° C., more preferably at 140 to 160° C., for 0.2 to 3 hours, preferably 0.5 to 2 hours, and more preferably 0.5 to 1.5 hours. The heating may be carried out in the atmosphere or in an inert atmosphere.

The heating in step c) may be preferably carried out at 650 to 850° C., more preferably at 700 to 800° C., for 0.5 to 4 hours, preferably 1 to 3 hours, more preferably 1.5 to 2.5 hours. The heating may be carried out in the atmosphere or in an inert atmosphere.

The heating in step d) may be preferably carried out at 850 to 1200° C., more preferably at 900 to 1000° C., for 0.2 to 3 hours, preferably 0.5 to 2 hours, and more preferably 0.5 to 1.5 hours. The heating may be performed in an inert atmosphere. The inert atmosphere may be formed using a gas such as argon, nitrogen, or an argon/nitrogen mixed gas, but is not limited thereto.

The carbon precursor may be at least one selected from glucose, sucrose, lactose, fructose, starch, tannic acid, and the like.

In one embodiment of the present invention, the carbon precursor and the template may be mixed in a weight ratio of 1:1 to 1:10. If the weight ratio of the carbon precursor and the template is out of the above range, it is not preferable because the amount of the carbon sheet laminated in the core part is too small, or it is not preferable because the shell is not properly formed. The mixing weight ratio of the carbon precursor and the template may be more preferably 1:4 to 1:8.

In one embodiment of the present invention, the preparing of the porous carbon material having the core-shell structure can be performed in a one-pot manner.

The present invention also relates to a sulfur-carbon composite comprising the porous carbon material having the core-shell structure and a sulfur component.

In the sulfur-carbon composite, techniques known in this field except for the configuration comprising a porous carbon material having the core-shell structure can be applied to the configuration without limitation.

The sulfur contained in the sulfur-carbon composite may be at least one selected from the group consisting of elemental sulfur ($S_8$) and a sulfur compound, and for example, may be at least one selected from the group consisting of inorganic sulfur, $Li_2S_n$ (n≥1), a disulfide compound, an organic sulfur compound and a carbon-sulfur polymer (($C_2S_x)_n$, x=2.5 to 50, n≥2).

In the case of the sulfur, since it does not have electrical conductivity alone, it is used in combination with a conductive material such as the porous carbon material having the core-shell structure of the present invention.

The porous carbon material having the core-shell structure provides a framework to which sulfur can be uniformly and stably fixed, and allows the electrochemical reaction to proceed smoothly by supplementing the low electrical conductivity of sulfur.

In addition, in the porous carbon material of the core-shell structure of the present invention, a core comprising stacked carbon sheets can facilitate the exit and entry of lithium ions and can perform a function of allowing the shell to inhibit the leaching of the lithium polysulfide. The porous carbon material having the core-shell structure includes irregular pores therein, and the average diameter of the pores may be in the range of 1 to 1000 nm, and the porosity may range from 10 to 90% of the total volume of the porous carbon material. If the average diameter of the pores is less than the above range, it is impossible to impregnate sulfur because the pore size is only at the molecular level. On the contrary, if the average diameter of the pores exceeds the above range, the mechanical strength of the porous carbon material is weakened, making it undesirable for application to a process for manufacturing an electrode.

The sulfur-carbon composite of the present invention may further include one or more carbon materials commonly used in this field in addition to the porous carbon material having the core-shell structure. For example, the carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); graphite such as natural graphite, artificial graphite, and expanded graphite, and activated carbon.

In the sulfur-carbon composite, the weight ratio of the above-described sulfur and the porous carbon material may be 9:1 to 7:3, preferably 9:1 to 7.5:2.5. If the content of sulfur is less than 70% by weight based on 100% by weight of the total of the sulfur-carbon composite, as the content of the porous carbon material is relatively increased, the specific surface area is increased, so that the content of the binder required for manufacturing the positive electrode is increased. The increase in the dead capacity of this binder may eventually increase the sheet resistance of the positive electrode and act as an insulator to prevent electron pass, thereby degrading the performance of the battery. On the contrary, if the content of sulfur exceeds 90% by weight, as sulfur compounds that are not combined with the porous carbon material aggregate with each other or are re-leached to the surface of the porous carbon material, it becomes difficult to receive electrons and cannot participate directly in the electrochemical reaction, and thus can result in loss of battery capacity.

Also, in the sulfur-carbon composite, the sulfur is located in at least one of the inner and outer surfaces of the above-described porous carbon material, and in this case, the sulfur may be present in less than 100%, preferably 1 to 95%, more preferably 60 to 90% of the entire inner and outer surfaces of the porous carbon material. When the sulfur is present on the inner and outer surfaces of the porous carbon material within the above range, the maximum effect may be exhibited in terms of electron transport area and wettability with electrolyte. Specifically, since sulfur is thinly and evenly impregnated on the inner and outer surfaces of the porous carbon material in the above range, the electron transport contact area can be increased during the charging and discharging process. If the sulfur is located in 100% of the entire inner and outer surface of the porous carbon material, the carbon material is completely covered with sulfur, and thus the wettability to the electrolyte is lowered, and the contact with the electrically conductive material contained in the electrode is lowered, so that it cannot receive electrons and cannot participate in an electrochemical reaction.

In one embodiment of the present invention, the diameter of the sulfur-carbon composite is not particularly limited in the present invention and may vary, but preferably may be 0.1 to 20 μm, more preferably 1 to 10 μm. When the above range is satisfied, there is an advantage that a high-loading electrode can be manufactured.

The production of the sulfur-carbon composite is not particularly limited in the present invention and may be performed by a method commonly used in this field. As an example, a method of simply mixing the sulfur and the porous carbon material and then heat-treating it to compound it may be used.

The present invention also provides a lithium secondary battery comprising the porous carbon material having the core-shell structure.

In addition, a lithium secondary battery comprising the sulfur-carbon composite is provided.

In the lithium secondary battery of the present invention, known configurations commonly applied to a lithium-sulfur battery in this field may be employed as it is, with regard to the configurations other than those containing the porous carbon material having of the core-shell structure and/or the sulfur-carbon composite.

Hereinafter, the lithium secondary battery will be described with reference to examples.

The lithium secondary battery of the present invention may comprise a negative electrode; a positive electrode; a separator provided between the positive electrode and the negative electrode; and an electrolyte.

The negative electrode may comprise a negative electrode active material, a binder, an electrically conductive material, and may further comprise a dispersant. The negative electrode active material may be used that is known in the art, and for example, may be $LiTi_2(PO_4)_3$, $Li_3V_2(PO_4)_3$, $LiVP_2O_7$, $LiFeP_2O_7$, $LiVPO_4F$, $LiVPO_4O$, $LiFeSO_4F$, etc. The negative electrode active material may have a carbon coating layer formed on its surface.

The negative electrode active material, the binder, the electrically conductive material, and/or the dispersing agent may form a negative electrode active material layer, and the negative electrode active material layer is incorporated into the negative electrode by preparing a slurry containing the above components according to a conventional method and applying the slurry to a current collector and drying it. Here, non-limiting examples of the current collector may comprise a foil produced by copper, gold, nickel or copper alloy, or a combination thereof.

The electrically conductive material is not particularly limited, but conductive materials such as graphite-based materials such as KS6, and carbon-based materials such as Super-P, Denka black, and carbon black, or conductive polymers such as polyaniline, polythiophene, polyacetylene, and polypyrrole can be used alone or in combination.

The method of manufacturing the negative electrode is not particularly limited, and may be manufactured in a form in which a negative electrode active material is bound to a current collector according to a conventional method known in the art.

The positive electrode may comprise a positive electrode active material, a binder, an electrically conductive material, and may further comprise a dispersant. As the positive electrode active material, a known positive electrode active material can be used, and for example, lithium manganese oxide, lithium cobalt oxide, lithium nickel oxide, lithium iron oxide, $LiNi_xMn_yCO_zO_2$ (NMC) which is a 3-component positive electrode material, or a lithium composite oxide obtained by combining them may be used. If the lithium secondary battery is a lithium-sulfur battery, the sulfur-carbon composite may be comprised as a positive electrode active material.

The positive electrode active material, binder, electrically conductive material, and/or dispersant may form a positive electrode active material layer, and the positive electrode active material layer may be comprised in the positive electrode by preparing a slurry containing the components according to a conventional method, applying it to a current collector and drying it. Here, a non-limiting example of the current collector may comprise a foil made of aluminum, nickel, or a combination thereof.

For example, as the electrically conductive material, carbon black such as Super-P, Denka black, acetylene black, Ketjen black, channel black, furnace black, lamp black, thermal black, and carbon black; Carbon derivatives such as carbon nanotubes and fullerene; electrically conductive fibers such as carbon fiber or metal fiber; metal powders such as carbon fluoride, aluminum and nickel powder; or electrically conductive polymers such as polyaniline, polythiophene, polyacetylene, and polypyrrole may be used.

The method for manufacturing the positive electrode is not particularly limited, and may be manufactured in the form of binding a positive electrode active material to a current collector according to a conventional method known in the art.

The separator positioned between the positive electrode and the negative electrode is one capable of separating or insulating the positive electrode and the negative electrode from each other and enabling lithium-ion transport between the positive electrode and the negative electrode. The separator used in the present invention can be used as long as it is a porous polymer substrate commonly used in this field, and for example, may be a polyolefin-based porous polymer membrane or a non-woven fabric, but is not particularly limited thereto.

Examples of the polyolefin-based porous polymer membrane may comprise a membrane formed from each of polyethylene such as high-density polyethylene, linear low-density polyethylene, low-density polyethylene, and ultra-high molecular weight polyethylene, and polyolefin-based polymers such as polypropylene, polybutylene, and polypentene alone or polymers obtained by mixing them.

The nonwoven fabric may comprise, in addition to polyolefin-based nonwoven fabrics, for example, nonwoven fabrics formed from each of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene and the like alone or polymers obtained by mixing them. The structure of the nonwoven fabric may be a spunbond nonwoven fabric or a melt blown nonwoven fabric composed of long fibers.

The thickness of the porous polymer substrate is not particularly limited, but may be 5 μm to 50 μm, and the pore size and porosity present in the porous polymer substrate are also not particularly limited, may be 0.01 μm to 50 μm and 10 to 95%, respectively.

In addition, in order to improve the mechanical strength of the separator and to improve the safety of the lithium secondary battery, a porous coating layer containing inorganic particles and a polymer binder may be further comprised on at least one surface of the porous polymer substrate.

In the lithium-sulfur battery of the present invention, any known electrolyte in this field may be used without limitation as the electrolyte, and for example, a non-aqueous electrolyte solution, an organic solid electrolyte, and an inorganic solid electrolyte, which contain lithium salt, may be used.

The non-aqueous electrolyte solution containing the lithium salt is composed of a lithium salt and a solvent, and as the solvent, a non-aqueous organic solvent, an organic solid electrolyte, and an inorganic solid electrolyte may be used.

The lithium salt is a substance which can be easily dissolved in a non-aqueous organic solvent, and for example, may be at least one selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$F$_5$SO$_2$)$_2$, LiN(SO$_2$F)$_2$, lithium chloroborane, lithium lower aliphatic carboxylate, lithium 4-tetraphenyl borate, and lithium imide.

The concentration of the lithium salt may be 0.1 to 4.0 M, preferably 0.5 to 2.0 M depending on various factors such as the exact composition of the electrolyte solution mixture, the solubility of the salt, the conductivity of the dissolved salt, the charging and discharging conditions of the battery, the operating temperature, and other factors known in the lithium-sulfur battery field. If the concentration of the lithium salt is less than the above range, the conductivity of the electrolyte solution may be lowered and thus the performance of the battery may be deteriorated. If the concentration of the lithium salt exceeds the above range, the viscosity of the electrolyte solution may be increased and thus the mobility of the lithium ion (Li$^+$) may be reduced. Accordingly, it is preferable to select an appropriate concentration of the lithium salt within the above range.

The non-aqueous organic solvent is a substance capable of dissolving a lithium salt well, and preferably, aprotic organic solvents such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, 1-ethoxy-2-methoxyethane, tetraethyleneglycol dimethylether, tetrahydrofuran, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate can be used alone or in a mixed solvent form of two or more solvents thereof.

As the organic solid electrolyte, for example, polyethylene derivatives, polyethylene oxide derivatives, polypropylene oxide derivatives, phosphate ester polymers, poly alginate lysine, polyester sulfide, polyvinyl alcohol, polyvinylidene fluoride, and polymers including ionic dissociation groups and the like can be used.

As the inorganic solid electrolyte of the present invention, for example, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$ may be used.

The non-aqueous electrolyte solution for the lithium-sulfur battery of the present invention may further comprise nitric acid or nitrous acid-based compounds as an additive. The nitric acid or nitrous acid-based compounds have an effect of forming a stable coating on the lithium electrode and improving the charging/discharging efficiency. The nitric acid or nitrous acid-based compounds is not particularly limited in the present invention, but may be at least one selected from the group consisting of inorganic nitric acid or nitrous acid-based compounds such as lithium nitrate (LiNO$_3$), potassium nitrate (KNO$_3$), cesium nitrate (CsNO$_3$), barium nitrate (Ba(NO$_3$)$_2$), ammonium nitrate (NH$_4$NO$_3$), lithium nitrite (LiNO$_2$), potassium nitrite (KNO$_2$), cesium nitrite (CsNO$_2$), and ammonium nitrite (NH$_4$NO$_2$); organic nitric acid or nitrous acid-based compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, and octyl nitrite; organic nitro compounds such as nitromethane, nitropropane, nitrobutane, nitrobenzene, dinitrobenzene, nitropyridine, dinitropyridine, nitrotoluene, and dinitrotoluene, and the combinations thereof. Preferably, lithium nitrate is used.

In addition, the non-aqueous electrolyte solution may further comprise other additives for the purpose of improving charging/discharging characteristics, flame retardancy, and the like. Examples of the additives may comprise pyridine, triethylphosphite, triethanolamine, cyclic ether, ethylene diamine, n-glyme, hexamethylphosphoric triamide, nitrobenzene derivatives, sulfur, quinoneimine dyes, N-substituted oxazolidinone, N, N-substituted imidazolidine, ethylene glycol dialkyl ether, ammonium salt, pyrrole, 2-methoxy ethanol, aluminum trichloride, fluoroethylene carbonate (FEC), propene sultone (PRS), vinylene carbonate (VC) and the like.

The lithium secondary battery may be configured by applying techniques known in the art except for the characteristic techniques of the present invention described above.

The lithium secondary battery can be manufactured by stacking or laminating process, folding process and stacking/folding process of the separator and the electrodes, in addition to the winding process which is a general process. In addition, the appearance of the lithium secondary battery is not particularly limited, but can be cylindrical type using can, square type, pouch type, coin type or the like Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention, and also it is natural that such variations and modifications are within the scope of the appended claims.

Preparation Example 1: Preparation of BZC (Basic Zinc Carbonazate)

$Zn(NO_3)_2 \cdot 6H_2O$, urea, and L-asparagine were mixed and stirred in a molar ratio of 1:5:1, followed by hydrothermal reaction at 120° C. for 3 hours, and then filtered and dried to prepare BZC. The molar ratio may be selected from the range of 1:1:1 to 1:10:1.

The BZC may also be purchased and used (e.g., Sigma-Arich company, alfa company, trade name: zinc carbonate basic).

Example 1~5: Preparation of Porous Carbon Material Having Core-Shell Structure

Glucose ($C_6H_{12}O_6$) as a carbon precursor and BZC as a template were mixed in the weight ratio of Table 1 below. Thereafter, the mixture was heated at 150° C. for 1 hour to penetrate glucose into BZC which is a template. Thereafter, the BZC, in which the glucose had penetrated into the core, was heated at 750° C. for 2 hours to form a porous carbon material having the core-shell structure while removing the template (morphology imprinting). Thereafter, the porous carbon material having the core-shell structure was heated at 950° C. in an inert atmosphere for 1 hour to vaporize and remove zinc impurities to prepare a porous carbon material having a core-shell structure.

TABLE 1

|  | Example 1 | Example 2 | Example 3 | Example 4 | Example 5 |
|---|---|---|---|---|---|
| BZC | 5 | 4 | 3 | 2 | 1 |
| Glucose | 1 | 1 | 1 | 1 | 1 |

Unit: parts by weight

Examples 6-10: Preparation of Porous Carbon Material of Core-Shell Structure

Sucrose ($C_{12}H_{22}O_{11}$, $T_m$: 186° C.) as a carbon precursor and BZC as a template were mixed in the weight ratio of Table 2 below. Thereafter, the mixture was heated at 200° C. for 1 hour to penetrate sucrose into BZC which is a template. Thereafter, the BZC, in which the sucrose had penetrated into the core, was heated at 750° C. for 2 hours to form a porous carbon material having the core-shell structure while removing the template (morphology imprinting). Thereafter, the porous carbon material having the core-shell structure was heated at 950° C. in an inert atmosphere for 1 hour to vaporize and remove zinc impurities to prepare a porous carbon material having a core-shell structure.

TABLE 2

|  | Example 6 | Example 7 | Example 8 | Example 9 | Example 10 |
|---|---|---|---|---|---|
| BZC | 5 | 4 | 3 | 2 | 1 |
| Sucrose | 1 | 1 | 1 | 1 | 1 |

Unit: parts by weight

Comparative Example 1: Preparation of Porous Carbon Material

After dispersing 1.6 g of BZC in 140 ml of deionized water, 6.9 g of CTAB, 1.05 g of resorcinol, 84.6 ml of ethanol and 0.2 ml of ammonia were added and mixed at 35° C. for 30 minutes, and then 1.5 ml of formalin was added and thereafter stirred for 6 hours. Subsequently, after aging without stirring for 12 hours, the product was centrifuged, washed several times with water and ethanol and dried.

Subsequently, the carbon precursor (RF polymer resin) and the BZC mixture were heat-treated at 150° C. for 1 hour, at 300° C. for 30 minutes, and at 800° C. for 2 hours. The heat-treatment was performed in an inert atmosphere, and the obtained sample was washed with 1M HCl and dried to prepare a porous carbon material F2SMC.

Figure 5:
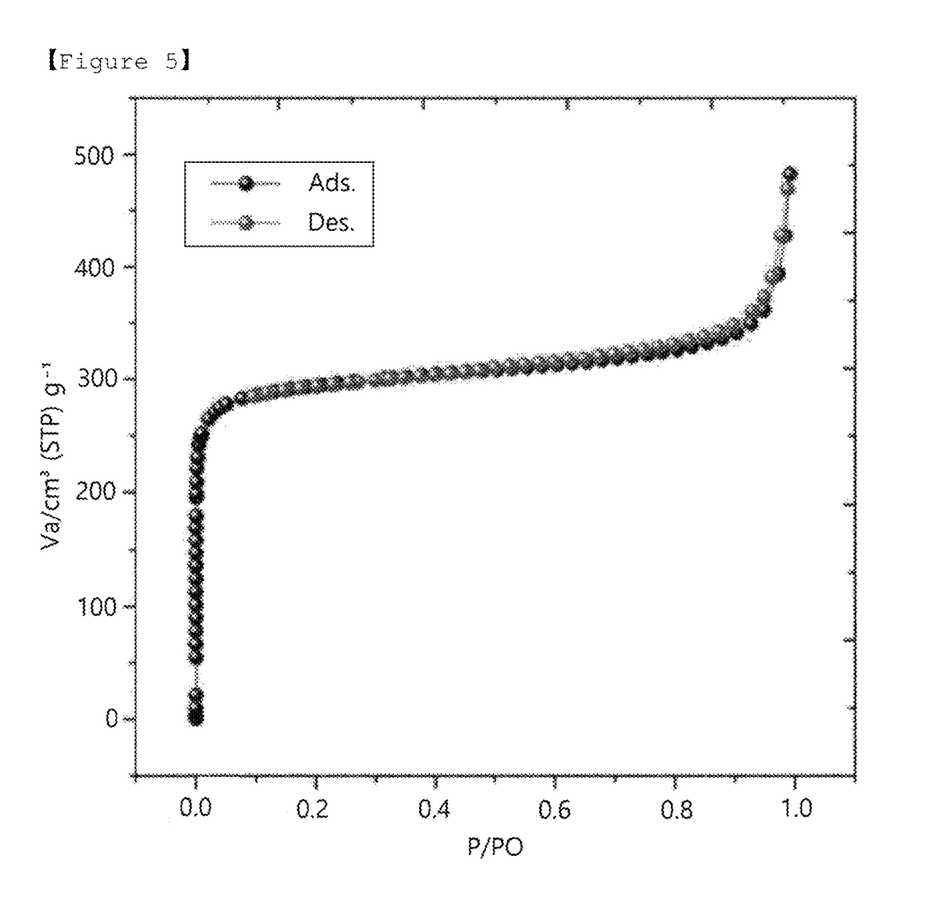
FIG. 5 is a graph showing the specific surface area of the porous carbon material having the core-shell structure prepared in Example 1 of the present invention.

Experimental Example 1: Measurement of Specific Surface Area of Porous Carbon Material Having Core-Shell Structure The specific surface area of the porous carbon material of the core-shell structure prepared in Example 1 was measured by N2 sorption ((manufactured by MicrotracBEL company, trade name: BELSORP-max) at 77 K using the Brunauer-Emmett-Teller method, and the results are shown in FIG. 5. As can be seen in FIG. 5, it was confirmed that the porous carbon material with the core-shell structure of the present invention has a specific surface area of 1050 $m^2/g$. In FIG. 5, Ads represents adsorption, and Des represents desorption.

Example 8: Preparation of Sulfur-Carbon Composite

The carbon material of the core-shell structure prepared in Example 1 and sulfur ($S_8$) were evenly mixed in a weight ratio of 2.5:7.5, and then placed in an oven at 155° C. and treated for 30 minutes to prepare a sulfur-carbon composite.

Comparative Example 2: Preparation of Sulfur-Carbon Composite

The carbon material of the core-shell structure prepared in Comparative Example 1 and sulfur (Ss) were evenly mixed in a weight ratio of 2.5:7.5, and then placed in an oven at 155° C. and treated for 30 minutes to prepare a sulfur-carbon composite.

Figure 1:
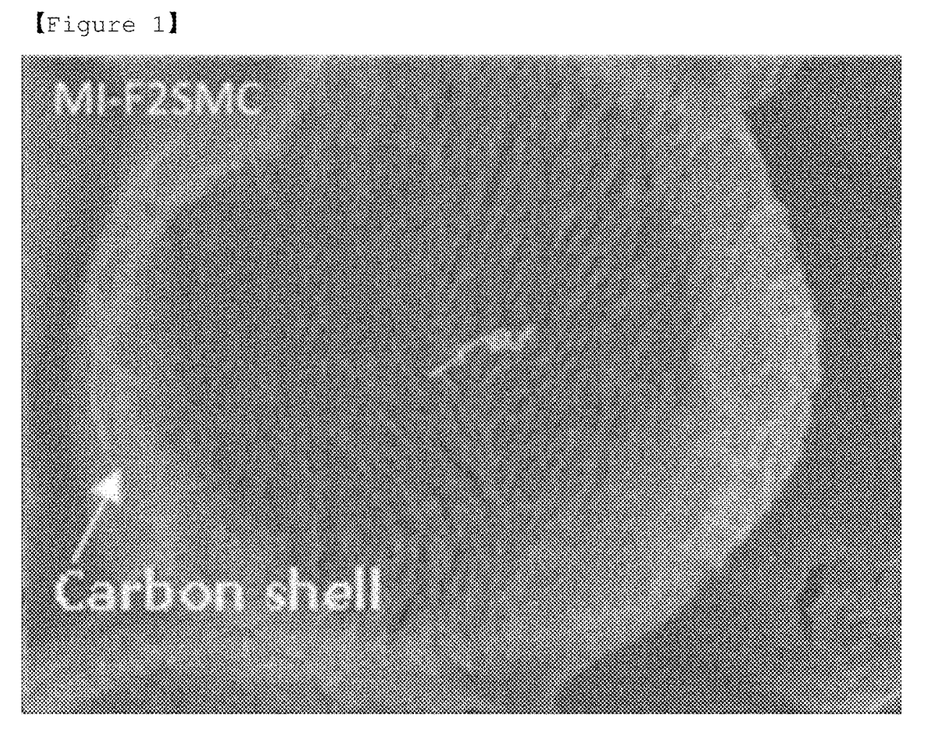
FIG. 1 shows a scanning electron microscope (SEM) photograph of the structure of a porous carbon material having a core-shell structure of the present invention.
Figure 2:
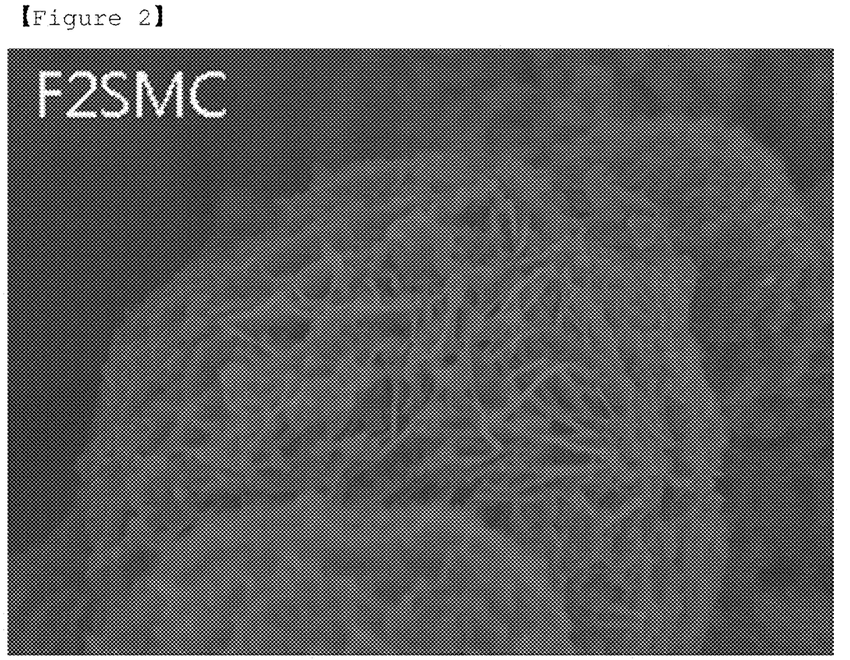
FIG. 2 shows a scanning electron microscope (SEM) photograph of the structure of a conventional porous carbon material.

Experimental Example 2: Confirmation of Structure of Porous Carbon Material and Sulfur-Carbon Composite In order to confirm the structure of the porous carbon materials prepared in Example 1 and Comparative Example 1, the shapes of the porous carbon material of the core-shell structure prepared in Example 1 and the porous carbon material prepared in Comparative Example 1 were photographed and compared using a scanning electron microscope (SEM) device (FIGS. 1 and 2). In addition, for the sulfur-carbon composite prepared in Example 8 and Comparative Example 2, a scanning electron microscope (SEM) photograph and an elemental mapping photograph were taken and compared using a scanning electron microscope (SEM) and energy dispersive spectroscopy (EDS) apparatus (FIGS. 3 and 4).

Specifically, FIG. 1 shows a scanning electron microscope (SEM) photograph of the porous carbon material having the core-shell structure prepared in Example 1. It can be seen from FIG. 1 that the porous carbon material having the core-shell structure of the present invention comprises a structure formed by stacking carbon sheets in a core, and comprises a shell comprising carbon surrounding the core.

FIG. 2 shows a scanning electron microscope (SEM) photograph of the porous carbon material prepared in Comparative Example 1. It can be seen from FIG. 2 that the porous carbon material in Comparative Example 1 had a flower-type open structure with no shell formed.

Figure 3:
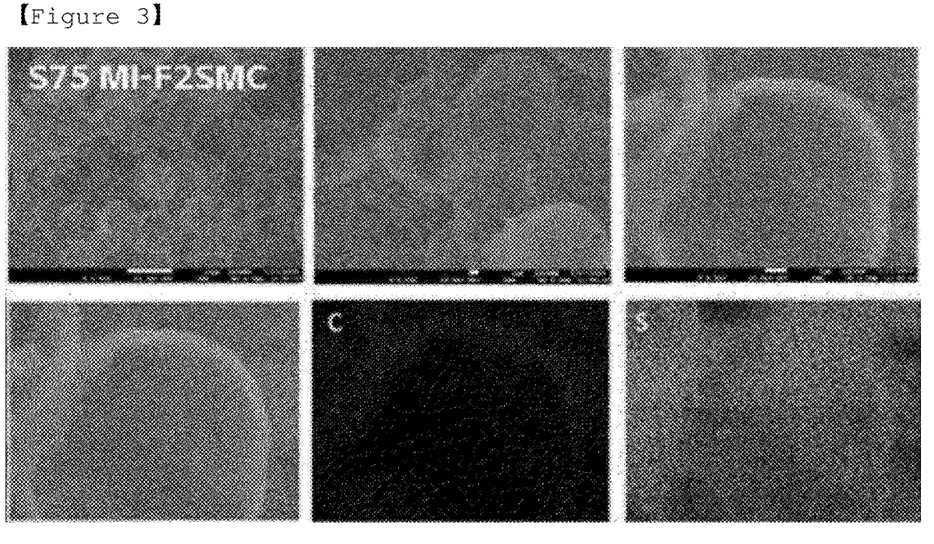
FIG. 3 shows a scanning electron microscope (SEM) photograph and an energy dispersive spectroscopy (EDS) element mapping photograph of the sulfur-carbon composite prepared in Example 8 of the present invention.
Figure 4:
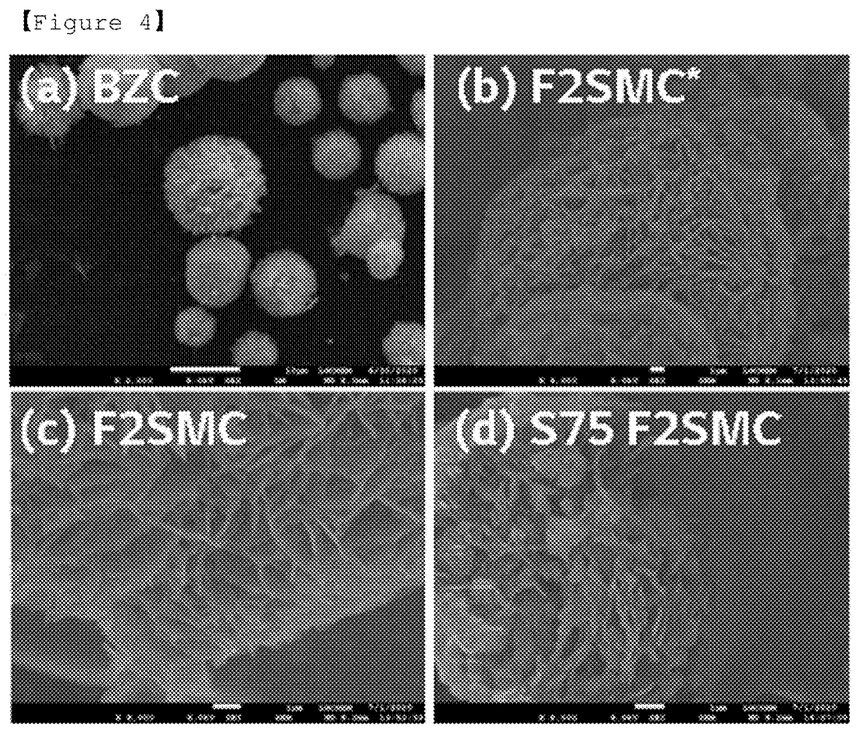
FIG. 4 shows a scanning electron microscope (SEM) photograph and an energy dispersive spectroscopy (EDS) element mapping photograph of the conventional sulfur-carbon composite prepared in Comparative Example 2.

FIG. 3 shows a scanning electron microscope (SEM) photograph and an energy dispersive spectroscopy (EDS) element mapping photograph of the sulfur-carbon composite prepared in Example 8. As can be seen from FIG. 3, it was confirmed that in the case of the sulfur-carbon composite containing the porous carbon material of the core-shell structure prepared in Example 8 of the present invention, carbon is detected in the shell and sulfur is detected in the core, and the sulfur contained in the core is uniformly supported without agglomeration or precipitation as crystals.

FIG. 4 shows a scanning electron microscope (SEM) photograph and an energy dispersive spectroscopy (EDS) element mapping photograph of the sulfur-carbon composite prepared in Comparative Example 2. From FIG. 4, it was confirmed that the sulfur-carbon composite of Comparative Example 1 does not form a shell structure, and appearance of sulfur precipitated as agglomerated crystals in the mesoporous structure is also observed.

Example 9 and Comparative Example 3: Manufacture of Lithium-Sulfur Battery 88 wt. % of the sulfur-carbon composite prepared in Example 8 and Comparative Example 2 as a positive electrode active material, 5 wt. % of carbon nanotubes as an electrically conductive material, 7 wt. % of polyacrylic acid as a binder and polyvinyl alcohol as a thickener (PAA:PVA=6.5:0.5 wt. %) were added and mixed to prepare a slurry composition for a positive electrode.

The prepared slurry composition for the positive electrode was applied on an aluminum current collector, dried at 50° C. for 12 hours, and compressed with a roll press device to prepare a positive electrode for a lithium-sulfur battery.

A lithium metal thin film with a thickness of 45 µm was used as the negative electrode together with the positive electrode prepared above, and a mixture solution formed by dissolving 1M concentration of lithium bis(trifluoromethanesulfonyl)imide (LiTFSI) and 1 wt. % of lithium nitrate (LiNO$_3$) in an organic solvent consisting of 1,3-dioxolane and dimethyl ether (DOL:DME=1:1 (volume ratio)) was used as an electrolyte.

Specifically, the prepared positive electrode and the negative electrode were placed to face each other, and polyethylene having a thickness of 16 µm and a porosity of 45% was placed as a separator between them, and then the prepared electrolyte was injected to prepare lithium-sulfur batteries of Example 9 and Comparative Example 3, respectively.

Experimental Example 3: Evaluation of Performance of Lithium-Sulfur Battery

After discharging and charging the lithium-sulfur batteries prepared in Example 9 and Comparative Example 3 at current densities of 0.1 C, 0.2 C, and 0.5 C, respectively, using a charging/discharging measuring device (LAND CT-2001A, Wuhan, China), the battery characteristics were evaluated by measuring the discharging capacity and coulombic efficiency. The results obtained at this time are shown in FIGS. 6 and 7.

Figure 6:
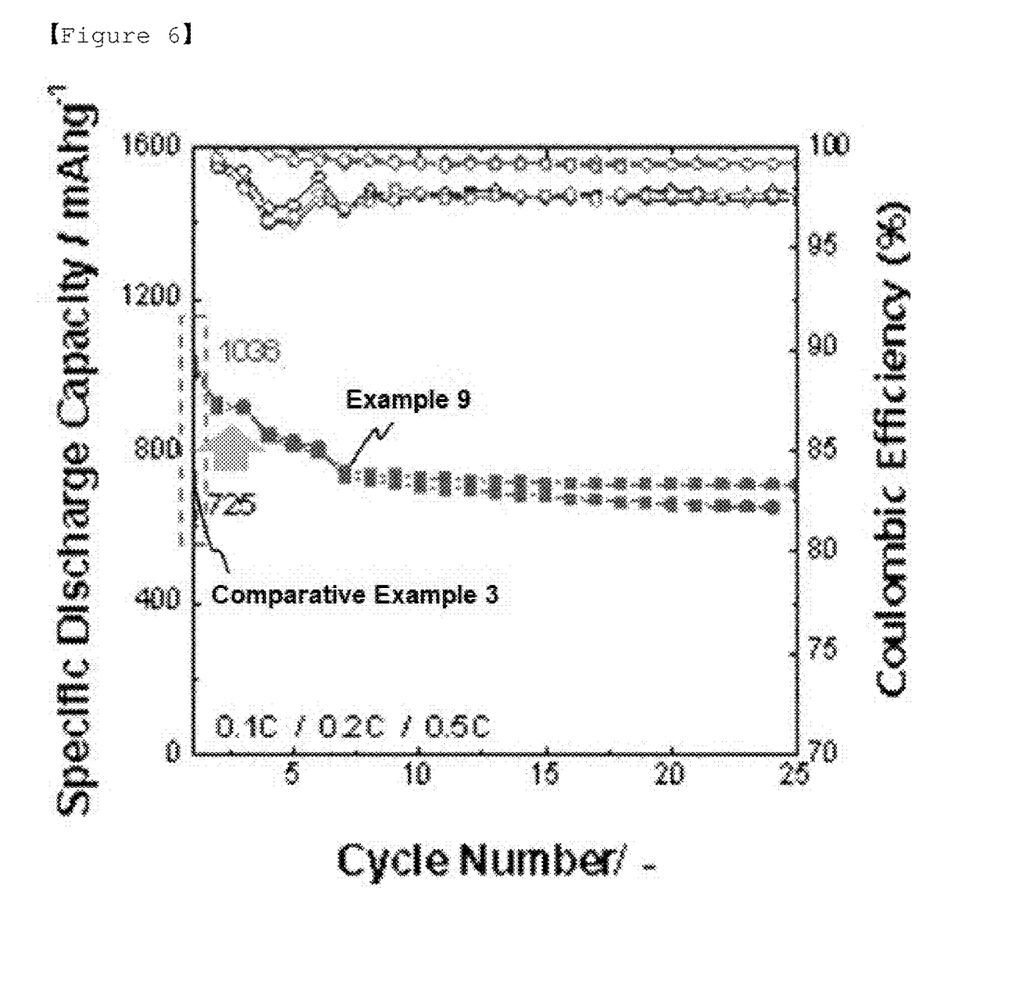
FIG. 6 is a graph showing the lifetime characteristics depending on the voltage of the lithium-sulfur batteries prepared in Example 9 of the present invention and Comparative Example 3.
Figure 7:
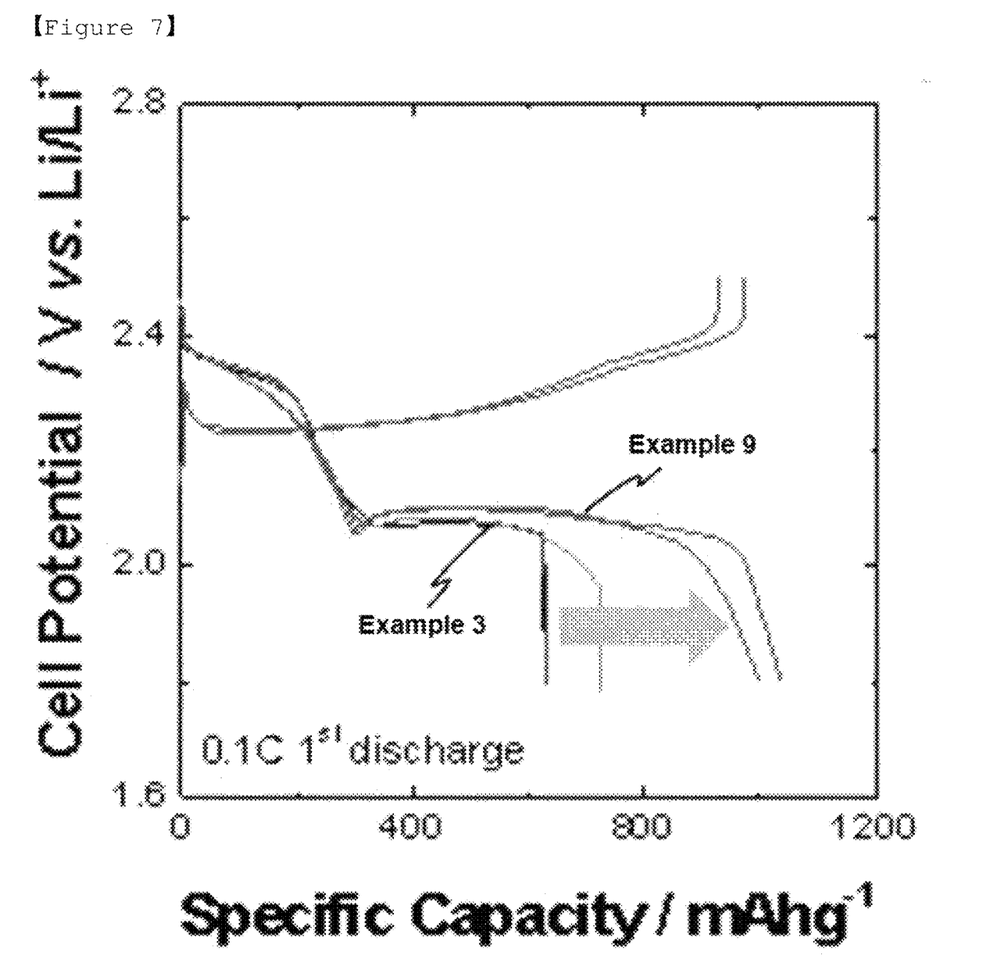
FIG. 7 is a graph showing the discharging capacity depending on the voltage of the lithium-sulfur batteries prepared in Example 9 of the present invention and Comparative Example 3.

As the experimental result, as shown in FIGS. 6 and 7, in the case of the battery of Comparative Example 3 (using the conventional carbon material S75 F2SMC composite (Comparative Example 1)), the initial 0.1 C discharging capacity was calculated to be 725 mAh/g, but after that, the charging delay phenomenon was occurred and the operation was no longer possible. This seems to be due to the limitations of the existing mesoporous carbon material having an open structure. On the other hand, it was confirmed that in the case of the battery of Example 9 of the present invention (using the porous carbon material having the core-shell structure of Example 1), the initial 0.1 C discharging capacity was calculated to be 1036 mAh/g, and even after that, the reaction is reversibly proceeded, and the capacity and lifetime characteristics of the battery are remarkably improved.

The invention claimed is:

1. A porous carbon material having a core-shell structure, comprising:
   a core having a structure of stacked carbon sheets; and
   a shell comprising carbon surrounding the core,
   wherein the porous carbon material includes irregular pores,
   wherein an average diameter of the irregular pores is in a range of 1 to 1000 nm and a porosity is in the range of 10 to 90% of the total volume of the porous carbon material, and
   wherein the porous carbon material has a specific surface area of 300 m$^2$/g to 2000 m$^2$/g.

2. The porous carbon material having the core-shell structure according to claim 1, wherein the carbon sheet is a graphene sheet.

3. The porous carbon material having the core-shell structure according to claim 2, wherein the stacked structure of the carbon sheets is a hierarchical porous structure.

4. The porous carbon material having the core-shell structure according to claim 1, wherein the core-shell structure is a heat-treated product in which a carbon precursor having a melting point of 130 to 350° C. is penetrated into the inside of one or more template particles selected from basic zinc carbonazate (BZC), zinc (II) metal-organic frameworks, and porous structure ZnO.

5. The porous carbon material having the core-shell structure according to claim 4, wherein the carbon precursor is at least one selected from the group consisting of glucose, sucrose, lactose, fructose, starch and tannic acid.

6. The porous carbon material having the core-shell structure according to claim 4, wherein the core includes the heat-treated carbon precursor, and the shell includes the heat-treated template.

7. A method for preparing a porous carbon material having a core-shell structure comprising the steps of:
   a) mixing a carbon precursor having a melting point of 130 to 350° C. and at least one particle selected from the group consisting of basic zinc carbonazate (BZC), zinc (II) metal-organic frameworks, and porous structure ZnO as a template;

b) penetrating the carbon precursor into the template by heating the mixture to 120 to 350° C.;

c) forming a core-shell shape while removing the template by heating the structure formed by penetration of the carbon precursor into the template to 600 to 900° C.; and d) heating the structure having the core-shell shape to 800 to 1500° C. to vaporize and remove zinc impurities.

8. The method for preparing the porous carbon material having the core-shell structure according to claim 7, wherein the carbon precursor is at least one selected from the group consisting of glucose, sucrose, lactose, fructose, starch, and tannic acid.

9. The method for preparing the porous carbon material having the core-shell structure according to claim 7, wherein the carbon precursor and the template are mixed in a weight ratio of 1:1 to 1:10.

10. The method for preparing the porous carbon material having the core-shell structure according to claim 7, wherein the preparation of the porous carbon material having the core-shell structure is performed in a one-pot method.

11. A sulfur-carbon composite comprising the porous carbon material having the core-shell structure of claim 1 and a sulfur component.

12. A lithium secondary battery comprising the sulfur-carbon composite of claim 11.

13. The sulfur-carbon composite according to claim 12, wherein a weight ratio of the sulfur component and the porous carbon material is 9:1 to 7:3.

* * * * *